United States Patent [19]

Laurent

[11] 3,858,694
[45] Jan. 7, 1975

[54] RESILIENTLY SUPPORTED ELECTRICAL DISTRIBUTION MEANS FOR MOVABLE CURRENT COLLECTING MEANS

[75] Inventor: Daniel Laurent, Grenoble, France

[73] Assignee: Societe Dauphinoise Electrique, Grenoble, France

[22] Filed: Feb. 20, 1973

[21] Appl. No.: 334,089

[30] Foreign Application Priority Data
Mar. 15, 1972 France .............................. 72.09748

[52] U.S. Cl. .................................... 191/32, 191/40
[51] Int. Cl. ...................................... B60m 1/30
[58] Field of Search ........ 191/32, 40; 104/123, 124, 104/125

[56] References Cited
UNITED STATES PATENTS
1,972,418  9/1934  Greer ..................................... 141/40
2,088,430  7/1937  Nelles ................................... 104/123
3,590,172  6/1971  Dehn ..................................... 191/32

Primary Examiner—M. Henson Wood, Jr.
Assistant Examiner—D. W. Keen
Attorney, Agent, or Firm—Stevens, Davis, Miller & Mosher

[57] ABSTRACT

Electrical distribution system adapted for sliding contact with a movable current collector head. The distribution rails are supported by longitudinally spaced apart resilient support members permitting thermal expansion and contraction movements of the rails.

9 Claims, 3 Drawing Figures

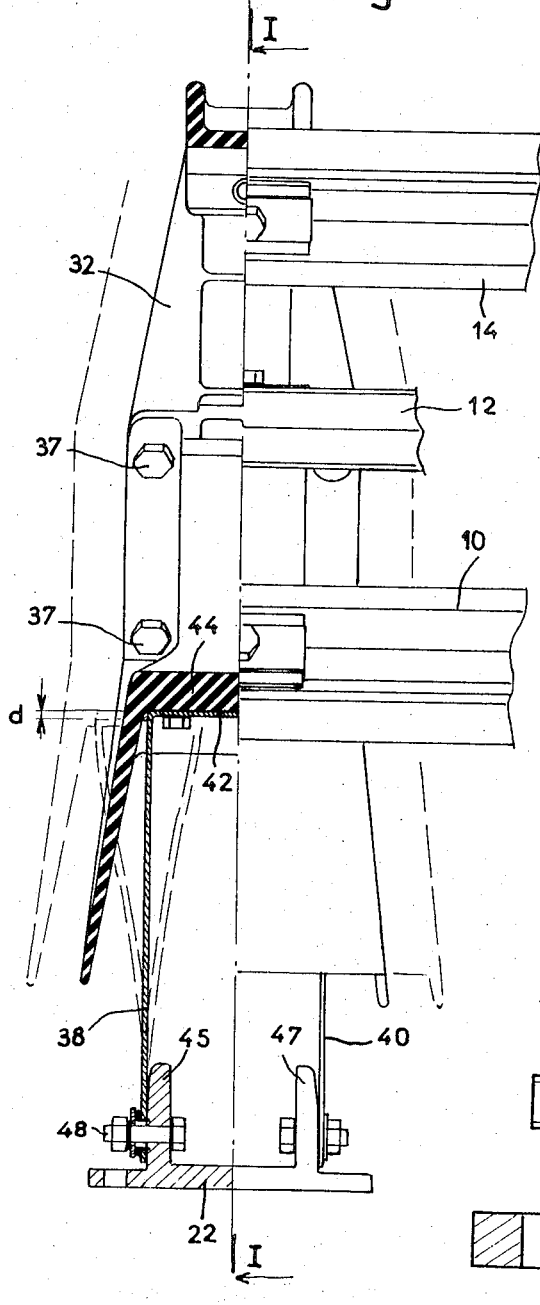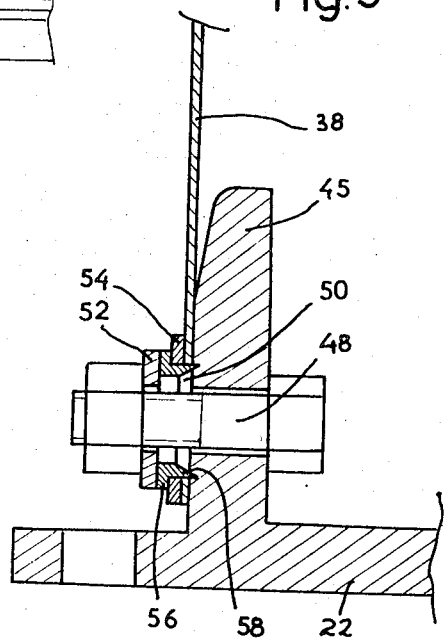

RESILIENTLY SUPPORTED ELECTRICAL DISTRIBUTION MEANS FOR MOVABLE CURRENT COLLECTING MEANS

This invention relates to an electrical distribution system comprising longitudinally extending conductive rail means adapted for slidable contact with a movable current collecting head.

In high speed transportation systems such as air cushion supported people movers the electric energy is generally supplied to the vehicles by a current collecting head which is driven by each vehicle along stationary conductor rails extending along the track which guides the vehicles. The rails may be three in number and supply a three-phase current to the vehicles. In this case, the three rails may form a passageway guiding the collector heads and be supported by stationary support elements which are regularly spaced apart along the track. To account for thermal expansion and contraction movements of the rails the latter are generally supported for slidable movement with respect to the stationary support members, usually by clamps secured to these members. In high-speed transportation systems the distribution systems must provide a highly accurate alignment of the conductor rails in order to avoid undesired parasitic movements (shimmy) of the collector heads which are guided by the rails and this requirement is generally difficult to reconcile with the necessity to allow for thermal movement of the rails. On the other hand, corrosion and accumulation of dirt may cause jamming of the rails in the clamps which results in warping of the rails or rupture of the support members.

It is an object of the invention to provide a simple weather-proof distribution system in which the collector heads are perfectly guided under all circumstances without interfering with the possibility for the rails to freely execute thermal movements.

It is a related object of the invention to provide a conductor rail support system in which the relative position of the rails is strictly maintained despite the thermal movements thereof.

These and other objects and advantages will become apparent from the following description of an embodiment of the invention shown in the annexed drawings, in which:

FIG. 2 is an end view from the left, partly in cross section taken on the line II—II of FIG. 1;

FIG. 3 is an enlarged view of a detail of FIG. 2.

Figure 1:
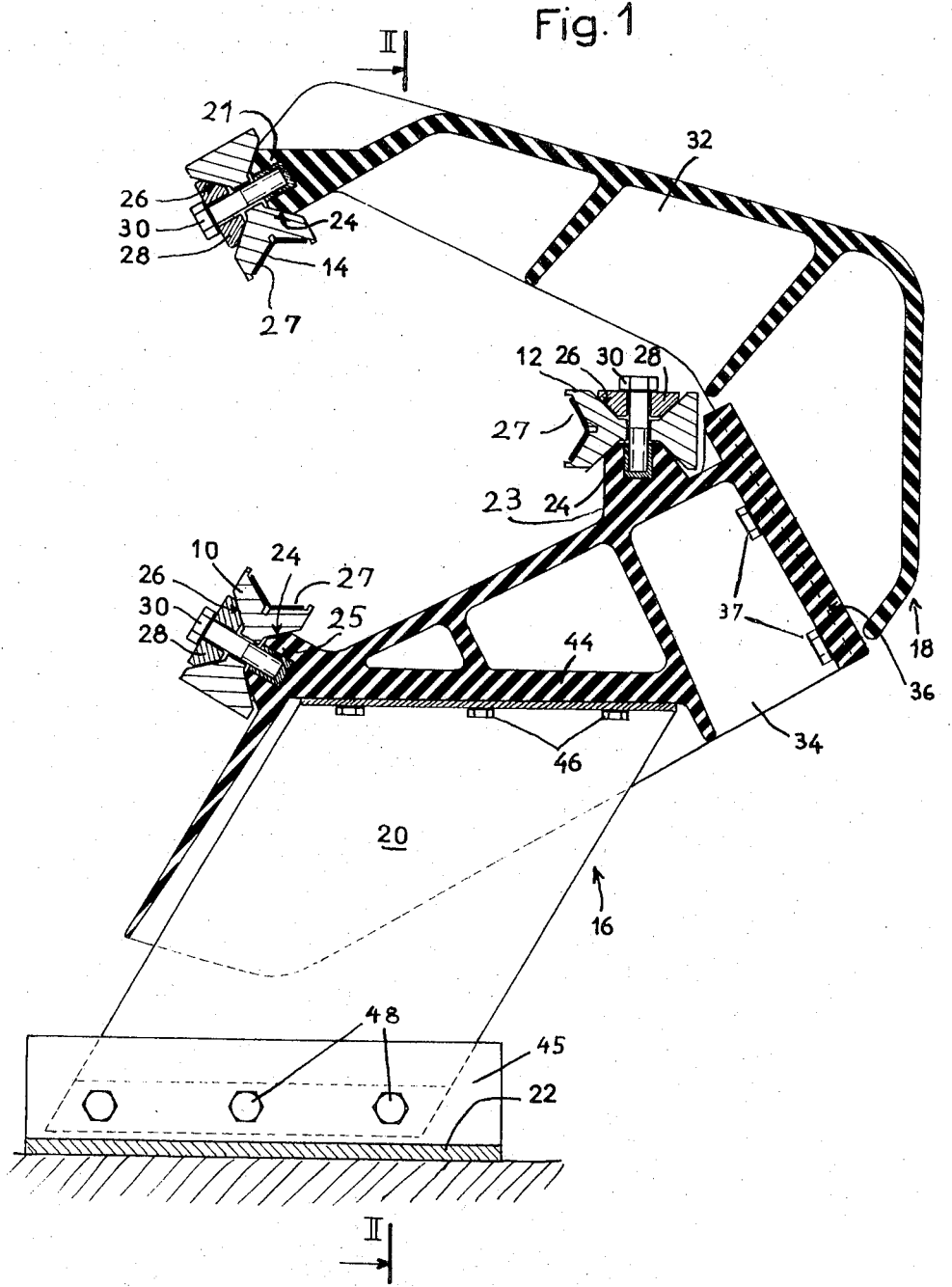
FIG. 1 is a cross section of a support member taken on the line I—I of FIG. 2.

Referring now to the drawings, there is shown a support member generally designated by the numeral 16 which supports three conductor rails 10, 12, 14 extending parallel to the track of a vehicle (not shown) such as an air cushion supported cabin which may be propelled by a three-phase linear induction motor fed by the rails 10, 12, 14. Each conductor may be connected to one phase of a three-phase supply source (not shown) and the phase rails are equidistantly disposed to define an inner passageway through which is driven by the vehicle a current collector head (not shown) having three contact shoes or sets of contact shoes disposed in sliding contact engagement with the three rails, respectively, in order to supply a three-phase current to the vehicle in a well known manner. A plurality of support members 16 is spaced apart along the track to support the rails 10, 12, 14 and since all support members may be of identical construction only one of them has been depicted and will now be described.

The support member shown comprises a bracket of insulating material generally designated by the numeral 18 and which is generally V-shaped, the legs of the recumbent V extending perpendicularly to the longitudinal direction of the rails. The insulating and supporting bracket 18 is connected to a stationary base member 22 by a resilient element 20 which will be described in further detail hereinafter. The base member 22 is fixed to the track, for instance to the bottom or ballast of a railway track. Each rail 10, 12, 14 has two opposite convex dihedral faces 24 and 26 cooperating with mating concave dihedral faces provided on three supporting studs 21, 23, 25 formed on the bracket 18 and on oppositely positioned wedge members 28. The intermediate inwardly directed contact face 27 of the rails is also of dihedral shape and the central web portion separating the faces 24 and 26 is perforated at regularly spaced apart locations to permit the passage of bolts 30 which secure the rails rigidly to the corresponding studs of the brackets. The dihedral bearing surfaces permit an accurate positioning of the rails on their supports without the possibility of any free relative motion whatsoever with respect to the bracket.

The molding and other processing methods existing at the present time do not provide highly accurate manufacturing possibilities for molded insulating parts of the kind at issue. Accordingly, the bracket 18 is composed of two legs: one leg 32 constituting the upper branch of the V to support at the free end thereof by stud 21 the rail 14 and another leg 34 constituting the lower branch of the V to carry the rails 12 and 10 through studs 23 and 25. The legs 32 and 34 include plane jointing end faces 36 which are adjustably connectable and extend preferably substantially parallel to a longitudinal symmetry plane of the prism defined by the three phase rails 10, 12, 14; i.e., in the embodiment shown in cross section in FIG. 1, parallel to the median of the equilateral triangle 10, 12, 14 drawn from the vertex 14. The molded elements 32, 34, which are preferably equipped with lightening holes or ribbed as shown, are individually inserted in a templet (not shown) to accurately position the bearing studs 21, 23, 25 before assembling the legs 32, 34 together along the jointing faces 36 by any suitable means, such as bolts 37, bonding or polymerization.

The bracket 18 is secured to the base member 22 by resilient connecting means formed by an inverted U-shaped spring leaf 20 the lateral legs of which extend perpendicularly to the longitudinal direction of the rails 10, 12, 14. The horizontal web portion 42 of the member 22 is rigidly secured by bolts 46 to a horizontal bearing end face 44 of the leg 34 of bracket 18. The base member 22 has two upstanding ribs or flanges 45, 47 duly spaced apart to permit the attachment of the lower ends of the legs 38, 40, respectively, through bolts 48. It is apparent that the base member 22 and the spring leaf member 38, 40, 42 constitute a resilient system supporting the rails 10, 12, 14 through brackets 18 in such a manner as to permit movement of the brackets substantially only in the longitudinal direction of the rails thereby to allow for free thermal expansion and contraction movements of said rails with respect to the fixed base members 22, as shown in dashed lines in FIG. 2. The support system 22, 38, 40, 42 works more or less as a jointed parallellogram, the sides 22 and 42 of which remaining parallel during the elastic deformation of the legs 38, 40. The height variation of the brackets shown at d in FIG. 2 is rather small as long as the longitudinal movements of the rails remain small with respect to the height of member 20. In practice these height variations are quite acceptable.

FIG. 3 shows a specific embodiment of an adjustable attachment of the legs to the base member. The aperture 50 at the lower end of legs 38 and 40 has a diameter which is greater than the outer diameter of bolt 48. A cogged washer 58 having axially extending cogs or teeth is put on the bolt 48 between a pair of washers 52 and 54 and the outer diameter of the cogged crown of washer 58 fits with small clearance into the opening 50 whereas the inner diameter of washer 58 is substantially greater than the outer diameter of the bolt 48. The teeth of the washer 58 penetrate into the flange 45 upon tightening of the bolt 48 after due positioning of the leg 38 with respect to the base member 22. This adjustable fixing permits also to correct a possible disalignment in operation of the system pursuant to movements of the track.

The resilient support members 20, seen in cross section, are preferably slanted with respect to the vertical which permits to bring the base members and the track (not shown) of the vehicle closer together.

In assembling the system, the legs 32 and 34 of the brackets are firstly duly connected together by tightening of the screws 37. The brackets 18 are then disposed on their base members 22 whereby the screws 48 are only moderately tightened. The resilient support members 20 are not accurately positioned with the help of suitable sighting methods and then definitively settled by further tightening of the screws 48, 50, that the gripping teeth of the washers 58 penetrate into the flanges of the base members 22. The rails 10, 12, 14 can now be mounted on the brackets whereby suitable expansion joints between adjacent sections may be provided. It is to be noted that the device according to the invention does not call for slidably connected parts capable of jamming and of presenting excessive clearance.

It is to be understood that the shown embodiment of the invention may be modified without departing from the spirit of the invention. For instance, the bracket 18 may be constituted by a single element or by more than two elements, and the resilient support member 20 may be differently executed such as by two independent vertically extending spaced apart spring leafs.

What is claimed is:

1. An electrical distribution system for use with movable current collecting means comprising longitudinally extending conductive rail means adapted for sliding contact with said current collecting means, a plurality of support members spaced apart along said rail means, each support member including a stationary base member; bracket means fixedly secured to said rail means; and resilient connecting means elastically yielding in substantially only one direction to connect said base member to said bracket means for movement of said bracket means substantially only in the longitudinal direction of said rail means to permit thermal expansion and contraction movements of said rail means relative to said base member.

2. A three-phase system according to claim 1, said rail means comprising three parallel equidistant phase rails, each support member comprising a generally V-shaped bracket of insulating material, said rails being fixedly secured to each bracket adjacent the free ends of the legs and adjacent the vertex thereof, respectively.

3. A system according to claim 2, each bracket being composed of a pair of elementary legs adapted for adjustable assembling together.

4. A system according to claim 3, said legs being adjustably assembled at jointing end faces extending substantially parallelly to a longitudinal symmetry plane of the prism defined by said phase rails.

5. A system according to claim 1, said resilient connecting means comprising spring leaf means.

6. A system according to claim 5, said spring leaf means having a general inverted U-shape.

7. A system according to claim 6, the free end portions of the legs of the U-shaped spring leaf means being adjustably secured to said base member, the web portion of the spring leaf means being attached to said bracket means.

8. A system according to claim 7, said legs having the general shape of a parallelogram extending transversely of the longitudinal direction of said rail means.

9. An electrical distribution system for use with movable current collecting means comprising longitudinally extending conductive rail means adapted for sliding contact with said current collecting means, a plurality of support members spaced apart along said rail means, each support member comprising a stationary base member and spring leaf means connecting said rail to said base member for movement of said rail relative to said base member substantially only in the longitudinal direction of said rail thereby supporting said rail in a manner permitting longitudinal thermal movements thereof without affecting the general position of the sliding-contact surface thereof relative to said current collecting means.

* * * * *